UNITED STATES PATENT OFFICE.

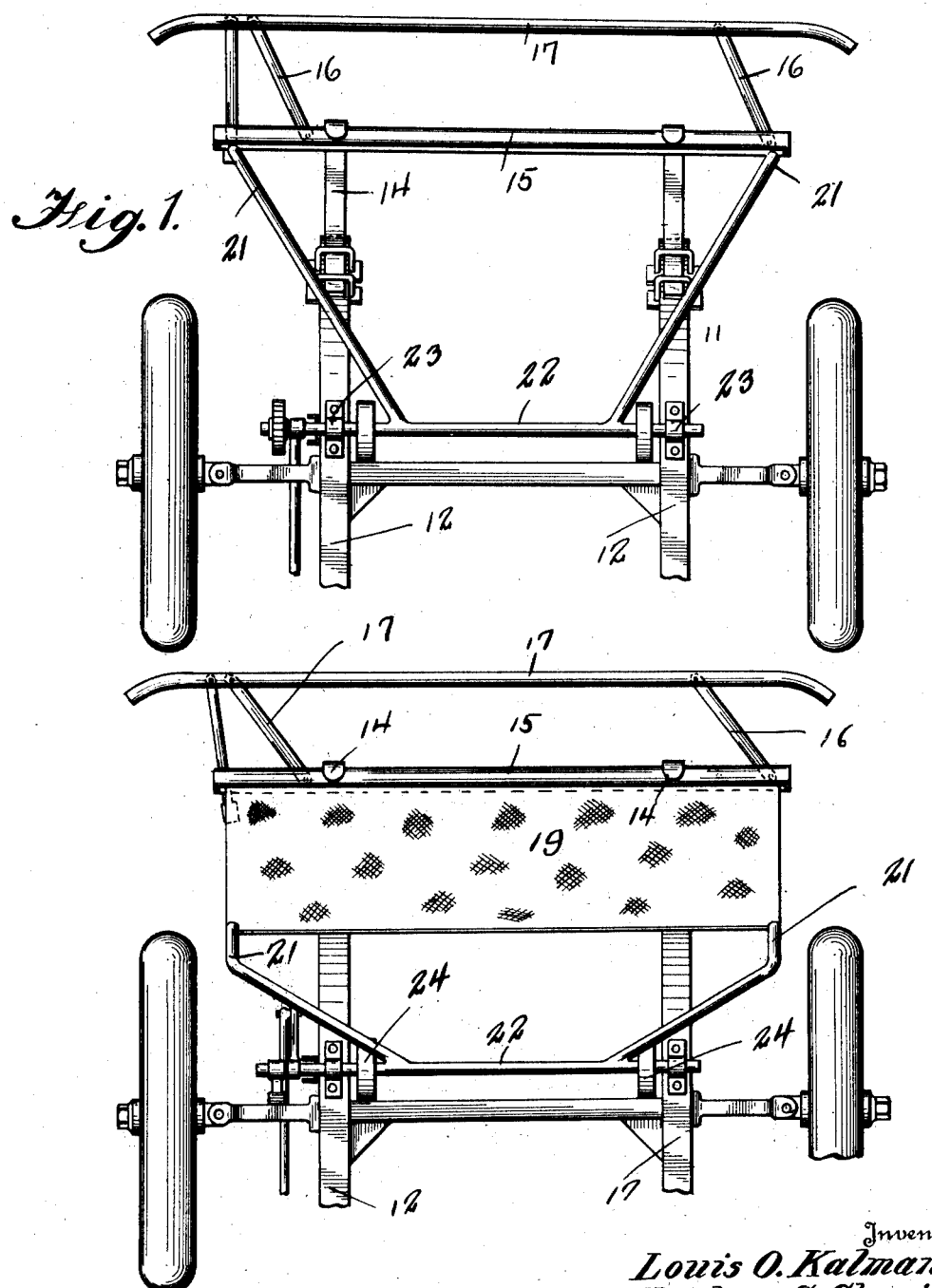

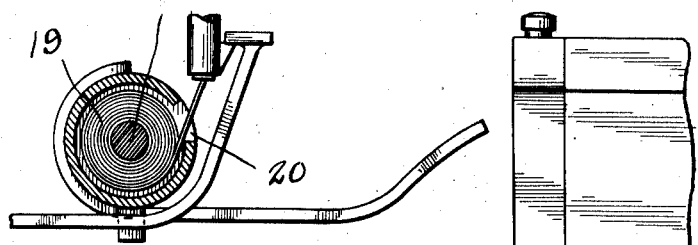
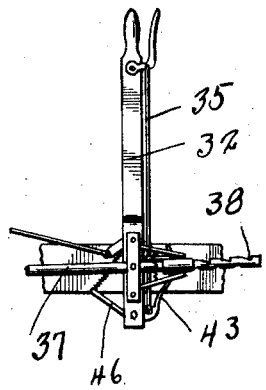
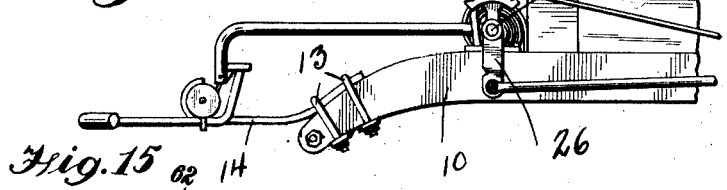
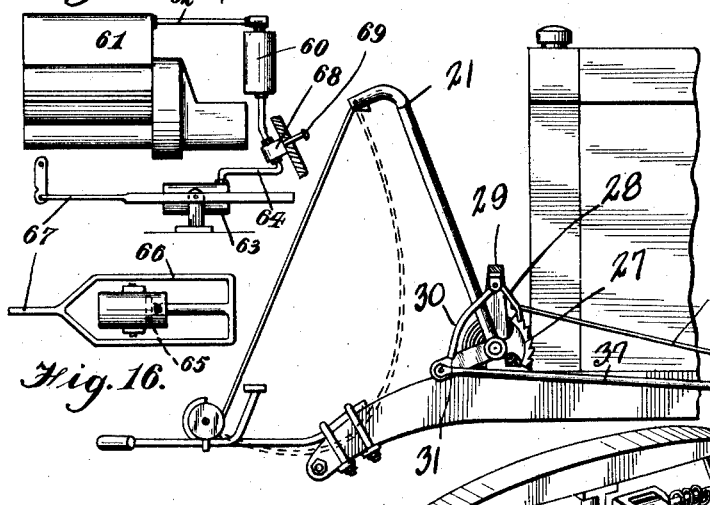

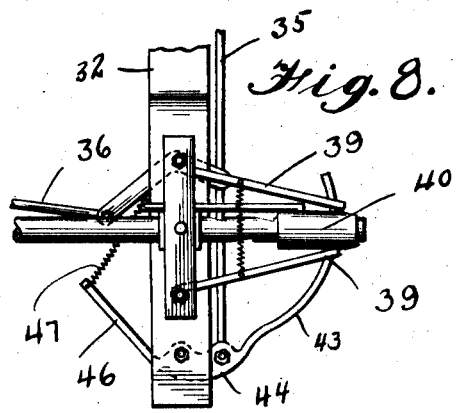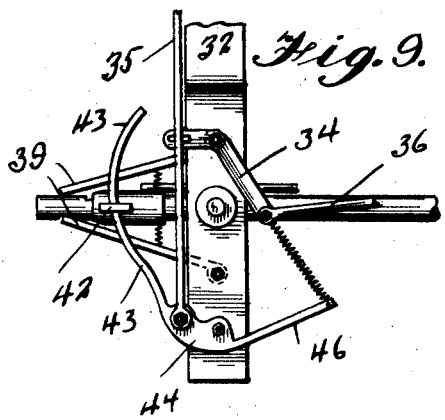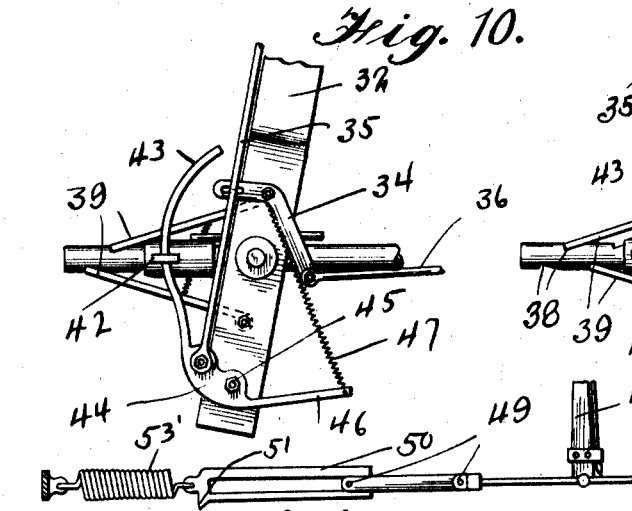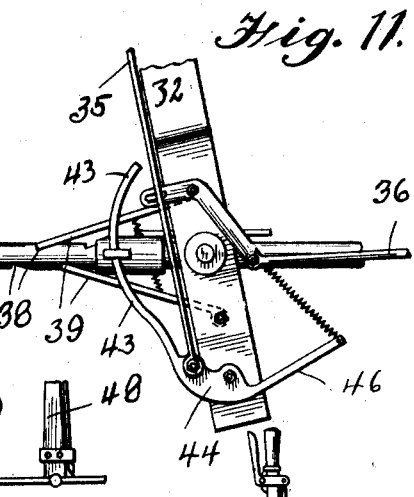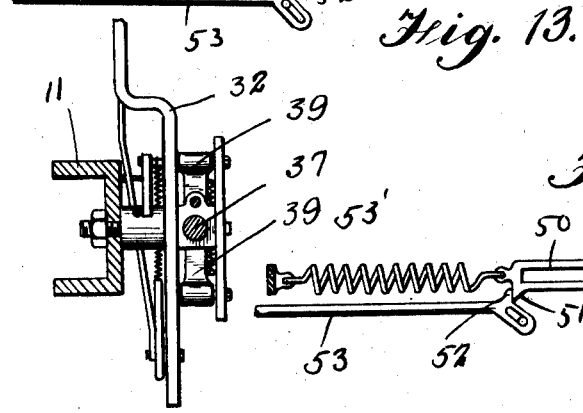

LOUIS O. KALMAN AND ABRAHAM S. SHAPIRO, OF MONTREAL, QUEBEC, CANADA.

AUTO SAFETY-BUMPER.

1,401,410.  Specification of Letters Patent.  Patented Dec. 27, 1921.

Application filed September 3, 1921. Serial No. 498,203.

*To all whom it may concern:*

Be it known that we, LOUIS O. KALMAN and ABRAHAM S. SHAPIRO, subjects of the King of Great Britain, residing at Montreal, in the Province of Quebec, Canada, have invented certain new and useful Improvements in Auto Safety-Bumpers; and we do hereby declare that the following is a full, clear, and exact description of the invention, such as will enable others skilled in the art to which it appertains to make and use the same.

The present invention relates to new and useful improvements in bumpers for automobiles and other like vehicles.

The primary object of the invention is the provision of a safety bumper for automobiles and the like so constructed as to prevent injury to any person who might be struck by the machine.

Another object of the invention is the provision of a net attachment carried by the bumper of an automobile, so designed that when the bumper strikes a person the net will be extended to catch the said person, preventing any injury to the person.

A still further object of the invention is the provision of means for automatically applying the brake to the machine when the bumper comes into engagement with a foreign object.

Still another object of the invention is the provision of a bumper including supporting means for the same and a net carried thereby together with a frame adapted to be raised when the bumper strikes a foreign object to extend the net to catch said object preventing injury thereto when struck by the machine.

A still further object of the invention is the provision of a bumper such as above referred to which will be comparatively simple and inexpensive to manufacture, reliable and efficient in use and readily operated.

With the above and other objects in view, the present invention resides in the novel features of construction, formations, combinations, and arrangements of parts to be hereinafter more fully described, claimed and illustrated in the accompanying drawings forming a part of the present application, and in which:

Figure 1 is a plan view of a portion of the front of an automobile frame with the bumper applied thereto shown in its folded position;

Fig. 2 is a similar view showing the same extended;

Fig. 3 is a side view thereof showing the same folded;

Fig. 4 is a similar view showing the same extended;

Fig. 5 is a transverse sectional view through the net;

Fig. 6 is a similar view taken through the supporting spring;

Fig. 7 is a perspective view showing the latch member;

Figs. 8, 9, 10 and 11 are views showing the various positions of the actuating lever for turning the parts to their initial positions;

Fig. 12 is a transverse sectional view taken therethrough;

Fig. 13 is a view showing the connection between the brake lever for releasing the apparatus; and, Fig. 14 is a similar view showing the parts in locked position, and, Figs. 15 and 16 illustrate modified forms of the operating mechanism.

Referring now to the accompanying drawings by corresponding characters of reference throughout the several views, the numeral 10 designates generally the forward portion of an automobile frame including the opposite side members 12 to the forward ends of which are attached a pair of clamps 13 which secure the forwardly extending brackets 14 which support a bar 15 carrying a pair of pivoted arms 16 to which the bumper 17 is pivotally connected. The bar 15 is formed hollow and is formed with a roller 18 journaled centrally thereof upon which a net 19 is attached at one edge and wound thereon, the opposite edge being extended through the slot 20 formed in the inner side of the said bar 15. This edge of the net is connected to the downwardly curved arms 21 which are formed integral upon a rotatable bar 22 journaled in suitable bearings 23 secured to the side members 12.

Springs 24 are attached to the opposite ends of the bar 22, and are connected to the forward portion 25 of the frame and serve to normally force the arms 21 to raised position.

An arm 26 is keyed to one end of the shaft 22 and is provided at its opposite end with a ratchet 27 adapted to engage a pawl 28 which is pivoted to a bracket 29 secured to a convenient portion of the frame. An extension 30 is formed integral upon the pawl 28 and rides upon the adjacent side of the arm 26 for engagement with a notch 31 formed in one edge of the arm for engaging the said arm and limiting the upward movement of the before described arms 21 to the position shown in Fig. 4 against the tension of the springs 24.

An operating lever is shown at 32 and is provided with a hand grip 33 which operates a bell crank lever 34 through the rod 35 for the purpose of pulling the link 36 in such manner as to free the pawl 28 from the ratchet 27, thus permitting the arms to be raised.

The arm 26 has connected thereto an operative rod 37 which serves to return the arms 21 to their initial position. To this end the rear end of the rod 37 is provided in its opposite edges with notches 38 which engage the spring pressed stepping fingers 39 in such manner that as the lever 32 is moved backwardly and forwardly, the said rod 37 will be drawn rearwardly, thus returning the arms 21 to their initial position, as shown in Fig. 3.

The rod 37 passes through a sleeve 40 which is provided at one side thereof with an ear 42. This ear 42 receives the cam extension 43 of an actuating member 44 pivoted as at 45 to the lower end of the lever 32. The member 44 is attached to the lower end of the rod 35 which is also connected to the bell crank lever 34 above referred to, while the extended end 46 of the member 44 is normally drawn upwardly by means of a spring 47. This serves to impart a sliding connection to the sleeve 40 when the lever 32 is actuated.

In order to apply the mechanism automatically when the brake is applied, the brake lever 48 is provided with a sliding connection 49 to a rack 50 so that the brake lever may be actuated when desired without actuating the rack 50. The rack 50 is provided with a stop 51 which engages a stop 52 formed upon a rod 53 which leads to the before mentioned rod 37 so that when the stops 51 and 52 are disengaged the spring 53' will serve to release the several parts and permit the arms 21 to be raised. The arms 21 are provided with stops 54 which engage the locking terminals 55 of the arms 56 carried by the bumper 17. Obviously when the bumper is forced inwardly, the stops 54 and 55 will be disengaged allowing the springs 24 to raise the arms to the desired position for extending the net.

From the foregoing description taken in connection with the accompanying drawings, it will be manifest that a bumper for automobiles and the like is provided which will fulfil all of the necessary requirements of such a device, and it should be understood in this connection, that various minor changes in the specific details of construction can be resorted to within the scope of the appended claims, without departing from the spirit or sacrificing any of the advantages of the invention.

Referring to Figs. 15 and 16 of the drawings, a modified form of air actuated mechanism is provided in which the cylinder 60 is connected to the motor 61 by the pipe 62 and to an operating cylinder 63 by a pipe 64. A piston 65 is mounted in the cylinder 63 and connected by a yoke 66 to an operating rod 67 by means of which the bumper is released.

A controlling valve is shown at 68 and serves to control the passage of air from the cylinder 60 to the cylinder 63 for the operation of the piston mounted therein. When it is desired to release the bumper by pressing the valve 10 or treadle 69, the said bumper will be actuated.

Having thus fully described the invention, what we claim as new and desire to protect by Letters Patent is:—

1. The combination in a machine of the character described, of a rotatable bar, a frame supported by said bar, springs engaging the bar for raising the frame upon release of the latter, a hollow tubular bar, a roller therein, a net wound upon the roller and secured to the frame, a latch member for engaging the frame and holding the same in lowermost position, an operative communication between the latch member and the bumper for releasing the same upon movement of the bumper, substantially as and for the purposes set forth.

2. The herein described mechanism, comprising in combination with an automobile, a bar rotatably mounted thereon, a frame including forwardly extending arms carried by the bar, means for rotating the bar and forcing the frame normally to raised position, a hollow bar mounted in advance of the frame, a roller positioned therein, a net wound upon the roller and attached to the ends of said arms, a bumper supported by the hollow bar, a latch member carried by the bumper and engaging the frame, for holding the latter in lowered position, said latch member adapted to release the same upon movement of the bumper, means for returning the frame to its lowermost position after the same has once been released, and means for locking the frame in raised position.

3. The herein described apparatus including the combination with an automobile, including a brake lever and brake rod, a movable bumper, an extension attached to the forward end of the brake rod, a rack for engagement with the extension, a rod having a stop thereon engaging the rack, a spring for normally forcing the rack in a forward direction, said bar being movably mounted whereby upon the inward movement of the bar, the rack will be released, and a bumper to which the bar is connected, as and for the purposes set forth.

In witness whereof we have hereunto set our hands.

LOUIS O. KALMAN.
ABRAHAM S. SHAPIRO.